United States Patent Office 3,032,561
Patented May 1, 1962

3,032,561
PROCESS FOR OXIDIZING LEUCO TRIPHENYL-METHANE COMPOUNDS
Josef Pikl, Glassboro, N.J., assignor to E. I. du Pont de Nemours and Company, Wilmington, Del., a corporation of Delaware
No Drawing. Filed Aug. 13, 1959, Ser. No. 833,383
5 Claims. (Cl. 260—393)

Certain triphenylmethane dyes have been sold for use in dyeing acrylic fibers for several years. The dyeing of acrylic fibers with various triphenylmethane dyes is more fully described in U.S. Patent 2,764,466, German Patent 949,649, A. P. Roy, American Dyestuff Reporter, 41, 846 (1952), I. M. S. Walls, J. Soc. Dyers and Colourists, 72, 261 (1956), H. Schoenefeld, Textil- U. Faserstofftechnik, 6, 205 (1956), W. Beckmann and O. Glenz, Melliand Textilber., 38, 296 (1957), and B. Kramrisch, J. Soc. Dyers and Colourists, 73, 85 (1957). These dyes are frequently made by first reacting aldehydes such as benzaldehyde or a halogen derivative thereof with aromatic amines such as aniline or toluidine to form the leuco derivatives. The latter are oxidized to the dye salts which are purified and isolated, preferably from aqueous solutions.

This invention relates to an improved method for the oxidation of such leuco triphenylmethanes which contain primary amino groups, the latter being quite vulnerable to oxidation treatments. It also relates to a combination of the improved oxidation process and purification of the dye thus obtained. The products obtained according to this invention are valuable dyes for acid-modified acrylic and polyester fibers.

The inventor faced the problem of improving the yields of triphenylmethane dyes containing primary amino groups, while maintaining high quality of these colors as exemplified by their strength, brightness and fastness on acrylic fibers.

It is an object of the present invention to produce significantly valuable dyes for the dyeing of acid-modified acrylic and polyester fibers. It is a further object of this invention to provide an improved oxidation process for and resulting purification of the dye product. These and other objects will become apparent in the following description and claims.

More specifically, the present invention is directed to the chloranil oxidation of a leuco triphenylmethane compound of the formula

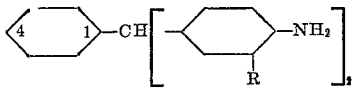

wherein R is H, CH$_3$ or C$_2$H$_5$, and the numbered phenyl radical carries chlorine in the 2-, 4-, 2,4-, 2,5- or 2,6- positions; the improvement comprises agitating 1 mole of said leuco compound and at least 1 mole of chloranil optionally with heating, in a water-immiscible solvent (or mixture of solvents) selected from the group consisting of chlorobenzene, o-dichlorobenzene, nitrobenzene and o-nitrotoluene; this novel process may be followed by hot, acidic aqueous extraction of pure dye salt at a pH of 5.0 or below, and subsequent precipitation of the water-insoluble carbinol by means of alkali, and isolation of said carbinol. Preferred embodiments are (1) where R is CH$_3$ and chlorine occupies the 2,4-positions; (2) where R is CH$_3$ and chlorine occupies the 2-position, and, (3) where R is C$_2$H$_5$ and chlorine occupies the 2-position.

It has been discovered that dyes of the heretofore defined narrow class can be prepared in significantly good yield and quality by utilizing a combination of (a) certain solvents and (b) chloranil as oxidizing agent. This combination of solvents and reactants is new and the results of highly improved yield and quality are unexpected, particularly in view of the related prior art.

Representative examples illustrating the present invention follow.

Example 1

(A) 30 parts of the leuco compound bis(4-amino-m-tolyl) (o-chlorophenyl)methane (prepared from o-chlorobenzaldehyde, o-toluidine and o-toluidine hydrochloride by well-known methods) are added to 180 parts of monochlorobenzene and then 33 parts of chloranil are added gradually. The reaction mixture is then heated and agitated for 5 hours at 65° to 70° C. When the reaction is completed most of the color formed has precipitated. The reaction product is filtered, and washed with monochlorobenzene. The press cake is added to 2000 parts of water, and steam distilled at pH 2–3 until the monochlorobenzene has been driven off. This pH results from dissolving the reaction mass in water without addition of any acid. The chlorine from chloranil provides the acid. The aqueous solution of the dye is filtered to remove insoluble impurities and byproducts of the oxidation. The water-insoluble carbinol base is obtained by adding 12 parts of sodium carbonate to the filtrate. The bis(4-amino-m-tolyl)(o-chlorophenyl)carbinol thus precipitated is filtered off in good yield and quality, washed alkali-free, and dried.

When the carbinol thus obtained is applied to acid-modified acrylic fiber from an acidic (pH 5) aqueous dyebath at 80° to 100° C., it gives a strong blue dyeing having excellent fastness properties. The color yield on the fiber (based on the leuco starting material) is about twice that obtained from the dyes made by either of the procedures disclosed in the example of German Patent 487,458.

(B) When the monochlorobenzene employed in Example 1 is replaced by 150 to 300 parts of o-dichlorobenzene, or nitrobenzene, or o-nitrotoluene, or any mixture comprising these four solvents, similar results are obtained.

Example 2

When the leuco compound used in Example 1 is replaced by an equivalent weight of one of the following leuco compounds, (1) Bis(p-aminophenyl)(o-chlorophenyl)methane,
(2) Bis(p-aminophenyl)(p-chlorophenyl)methane,
(3) Bis(p-aminophenyl)(2,4-dichlorophenyl)methane,
(4) Bis(p-aminophenyl)(2,5-dichlorophenyl)methane,
(5) Bis(p-aminophenyl)(2,6-dichlorophenyl)methane,
(6) Bis(4-amino-m-tolyl)(p-chlorophenyl)methane,
(7) Bis(4-amino-m-tolyl)(2,4-dichlorophenyl)methane,
(8) Bis(4-amino-m-tolyl)(2,5-dichlorophenyl)methane,
(9) Bis(4-amino-m-tolyl)(2,6-dichlorophenyl)methane,
(10) Bis(4-amino-3-ethylphenyl)(o-chlorophenyl)-methane,
(11) Bis(4-amino-3-ethylphenyl)(p-chlorophenyl)-methane,
(12) Bis(4-amino-3-ethylphenyl)(2,4-dichlorophenyl)-methans,
(13) Bis(4-amino-3-ethylphenyl)(2,5-dichlorophenyl)-methane, or
(14) Bis(4-amino-3-ethylphenyl)(2,6-dichlorophenyl)-methane, the corresponding carbinols are obtained in excellent yields.

The amount of solvent employed is not critical. The examples show 6 parts per part of leuco compound. Less can be used but the oxidation mass becomes too thick to be stirred readily. More solvent has been used, up to about 10 parts, but the larger amounts are uneconomical and not necessary. It is understood that sufficient solvent is to be used to enable one to stir the mass until the oxidation is complete, knowing that the oxidized dye is suspended in the solvent in the form of the dye salt.

The upper amount of chloranil is not critical. The leuco compounds have been oxidized using from 1.25 to 2.25 moles of chloranil per mole of leuco. In Example 1, 1.5 moles of chloranil are employed. It is believed that 1.0 mole is theory for the reaction. Satisfactory yields were obtained when over twice this amount was used. Larger amounts are not desirable because of the added cost. It is believed that larger amounts would be operable.

The temperature and time of the reactions also are not critical. Example 1 specifies 5 hours at 65° to 70° C. The time of reaction varies, depending on the temperature and the solvent employed, from about 0.5 hour to 20 hours. The reaction has been essentially completed at ambient temperature (25° to 30° C.), also at 110° C. Obviously, the longer reaction times are required at the lower temperatures. In nitrobenzene, for example, the oxidation is completed in about 1 to 2 hours at 65° C.

Steam distillations to remove the aromatic solvents have been conducted in the presence of the aqueous dye solutions at a pH as low as 2.2.

The choice of alkali used to precipitate the carbinol in the final step is not critical, any alkali metal or ammonium carbonate or hydroxide being operable. Representative examples of suitable alkali are: sodium carbonate, potassium carbonate, ammonium hydroxide, sodium hydroxide and potassium hydroxide.

The present invention is directed to a new combination of reactants and solvents used to provide commercially feasible yields and quality in a narrow range of primary amino substituted triphenylmethane dyes which are used for dyeing acid-modified acrylic and polyester fibers.

As noted, the well-known prior art processes for the primary amino substituted triphenyl methane dyes give poor yields. It should also be noted that some of the prior processes, e.g., the combination of chloranil, acetic acid and the leuco used in Example 1, give fairly satisfactory weight yields of crude color whose dyeings, however, are less than two thirds as strong as those obtained from the corresponding dye produced according to this invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the chloranil oxidation of a leuco triphenylmethane compound of the formula

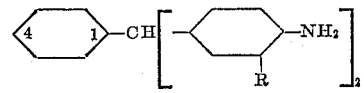

wherein R is taken from the group consisting of H, CH$_3$ or C$_2$H$_5$, and the numbered phenyl radical having chlorine in a known position taken from the group consisting of 2-, 4-, 2,4-, 2,5-, and 2,6-positions, the improvement which consists of agitating one mole of said leuco compound with at least one mole of chloranil in a water-immiscible solvent selected from the group consisting of chlorobenzene, o-dichlorobenzene, nitrobenzene, o-nitrotoluene, and mixtures of said solvents.

2. The process of claim 1 wherein R is CH$_3$ and chlorine occupies the 2,4-positions of the numbered phenyl radical.

3. The process of claim 1 wherein R is CH$_3$ and chlorine occupies the 2-position of the numbered phenyl radical.

4. The process of claim 1 wherein R is C$_2$H$_5$ and chlorine occupies the 2-position of the numbered phenyl radical.

5. In the chloranil oxidation of a leuco triphenylmethane compound of the formula

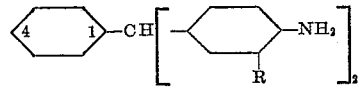

wherein R is taken from the group consisting of H, CH$_3$ of C$_2$H$_5$, and the numbered phenyl radical having chlorine in a known position taken from the group consisting of 2-, 4-, 2,4-, 2,5-, and 2,6-positions, the improvement which consists of agitating one mole of said leuco compound with at least one mole of chloranil in a water-immiscible solvent selected from the group consisting of chlorobenzene, o-dichlorobenzene, nitrobenzene, o-nitrotoluene, and mixtures of said solvents, followed by hot, acidic aqueous extraction of the resulting dye salt at a pH up to about 5.0, followed by alkali precipitation of the water-insoluble carbinol product and then isolating said carbinol product.

References Cited in the file of this patent

FOREIGN PATENTS 487,458   Germany _____ Dec. 6, 1929